United States Patent [19]

Evans et al.

[11] Patent Number: 5,506,928
[45] Date of Patent: Apr. 9, 1996

[54] OPTICAL FIBER GRIPPING AND POSITIONING APPARATUS

[75] Inventors: David C. Evans, Cambridge; Peter J. Schnurr, Breslau, both of Canada

[73] Assignee: ATS Automation Tooling Systems Inc., Cambridge, Canada

[21] Appl. No.: 453,384

[22] Filed: May 30, 1995

[51] Int. Cl.$^6$ ............................................. G02B 6/00
[52] U.S. Cl. ........................ 385/136; 385/137; 385/134
[58] Field of Search ............................ 385/136, 137, 385/134, 135; 269/157, 217, 902, 903

[56] References Cited

U.S. PATENT DOCUMENTS

| | | | |
|---|---|---|---|
| 5,135,590 | 8/1992 | Basavanhally et al. | 385/137 X |
| 5,185,846 | 2/1993 | Basavanhally et al. | 385/137 |
| 5,386,490 | 1/1995 | Pan et al. | 385/134 |

Primary Examiner—John D. Lee
Assistant Examiner—Phan T. H. Palmer
Attorney, Agent, or Firm—R. Craig Armstrong

[57] ABSTRACT

The apparatus uses a gripper mounted on a moveable arm to pick up an optical fiber at a pickup location, with the free end of the optical fiber extending from the gripper. The arm is moved to position the free end generally in the region of the target location, but slightly displaced therefrom. An image of the region of the target location is obtained from a camera directed to receive the image, where the region is backlit by diffused light from a light source. Where the target is a component on a translucent substrate, the substrate may act as the diffuser for the light source. The image from the camera is analyzed to determine the position of the free end in relation to the target location, and the arm is moved to accurately position the free end at the target location based on the determination of relative positions. The gripper has a downwardly-opening inverted V-shaped groove running longitudinally, to which a vacuum is supplied.

9 Claims, 4 Drawing Sheets

OPTICAL FIBER GRIPPING AND POSITIONING APPARATUS

BACKGROUND OF THE INVENTION

1. Field of the Invention

This invention relates to equipment for handling and placing optical fibers.

Optical fibers are used commonly for transmission of digital data because they are capable of transmitting high volumes of data due to their large bandwidth. The fibers and components to which the fibers must be connected for functionality are very small and therefore difficult to easily manipulate and work with. An optical fiber might be only 80 microns in diameter, and components such as transmitters, receivers and transducers might not be more than 100 microns in typical dimensions.

Given the precision required for handling and connecting optical fibers to components, use of robots in the process results in higher-quality end products and reduces the rejection rate of the assembled equipment. However, because of the small dimensions of an optical fiber, automation of the handling and positioning of the fiber has always posed considerable difficulty.

2. Description of the Prior Art

There are a number of types of devices currently available for handling optical fibers, three of which are discussed below.

The first type uses an upwardly-opening groove, into which the fiber is placed. A "lid" is then placed over the optical fiber to hold the fiber firmly between the lid and the groove. In the closed state, the lid must be mechanically locked into position.

The second type is similar in concept to the first type. A groove is provided in a simple cylinder. The optical fiber is pushed into the groove, so that the fiber sits below the outer circumference of the cylinder. A cover, such as a sheath, is placed over the cylinder to prevent the optical fiber from slipping out.

Both of the above types of devices apply mechanical pressure to the fiber in order to hold the fiber in place. The mechanical pressure however may damage the fiber and potentially change its optical characteristics. Also both types strongly depend on the diameter of the optical fiber in order to secure a hold on the fiber. Automating these grippers is difficult for a variety of reasons, including relative bulkiness, the need of a human operator to place the fiber into the gripper, the weight of the grippers, and the gripper size relative to the placement accuracy needed.

The third type of device involves soldering or welding a T-shaped or L-shaped "handle" to the fiber. A gripper can then pick, orient, and place the fiber by moving the handle. This requires applying heat to the end of the optical fiber to attach and detach the handle, increasing the risk of damage to the fiber. During the removal phase, the fiber may move, thereby reducing the quality of the finished product.

The invention uses a vacuum gripper, as will be described in greater detail later. Vacuum has been used previously by stationary grippers to hold an optical fiber steady, as disclosed in U.S. Pat. Nos. 5,135,590, 5,386,490, and 5,185,846, for example, but vacuum does not appear to have been used in a moveable gripper to grip, move and position an optical fiber.

Apart from the difficulty in handling optical fibers, determining the fiber's position with precision is also difficult. To properly connect the optical fiber to a component, accurate positioning and position determination are both essential, if reject rates are to be kept at acceptable levels. There is therefore a need for apparatus which can effectively grip the fiber, determine its position, and move it precisely to the desired position. One of the most common methods of determining position for automation purposes is to use a vision system to capture and analyze an image of the fiber by standard image processing software. However, because the fibers are largely transparent under normal direct illumination, they are more or less invisible to a camera, even with normal contrast enhancement. The image which may be obtained from them does not have sufficiently sharp defining lines to be used by the image processing software. There is therefore a need to provide sufficient contrast to enable the vision system to capture an image which permits the position of the fiber to be readily ascertained.

SUMMARY OF THE INVENTION

In view of the above, it is an object of the invention to provide a system which is capable of holding an optical fiber, determining the position of the end of the fiber in relation to a target location, and transporting it to the target location with high precision.

It is a further object of the invention, in the context of such a system, to provide a gripper which is able to lift and hold the optical fiber efficiently and without damage.

In the invention, the system uses a gripper which has a downwardly-opening groove, preferably V-shaped, running longitudinally, to which a vacuum is supplied.

The gripper is carried by a movable arm, which is used to pick the optical fiber from a pickup location and to move it to the area of the target location. A vision system, using a camera and image analysis software, determines the location of the end of the optical fiber in relation to the target, in the X-Y plane, the location of the target and of the optical fiber in the Z or height plane already being known. The detected location of the end of the optical fiber in relation to the target determines what movement of the arm is required to move the end of the fiber to the target location.

To permit the vision system to see the end of the optical fiber, diffused back lighting is used. In one application, where the target is a component mounted on a translucent substrate, the substrate acts as the diffuser for the light source. The diffused back-lighting provides sufficient contrast for the image captured by the camera to be analyzed to determine the position of the end of the fiber.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
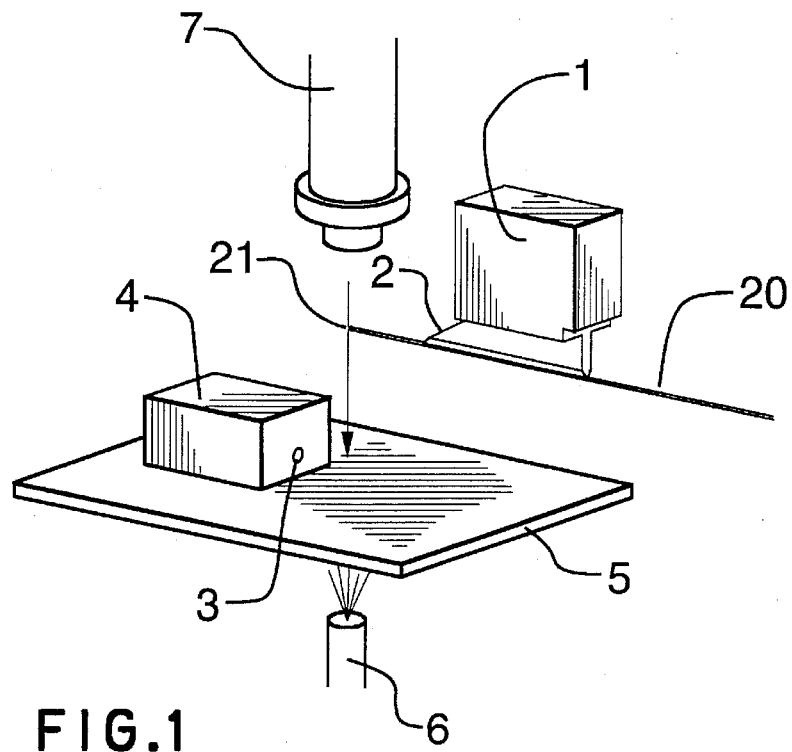
FIG. 1 is a schematic perspective view of the key components of the system.
Figure 2:
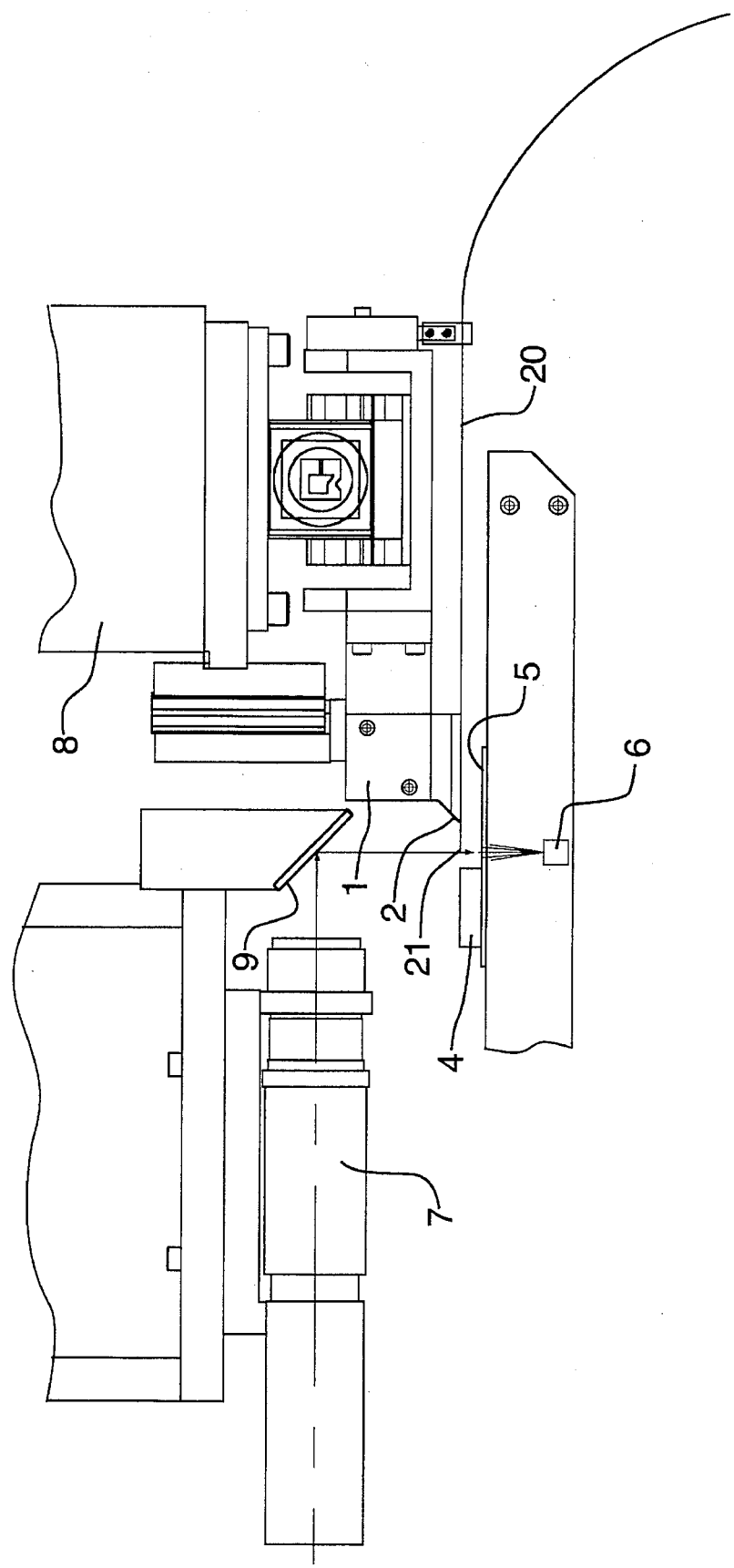
FIG. 2 is a side elevation view of the actual system components.

FIGS. 1 and 2 shown the main components of the system. A gripper 1 has a tip 2 which holds an optical fiber 20 near its end 21, for positioning adjacent a target location 3, in this case on a component 4 mounted on a substrate 5. The gripper could be used in any other operation where precise positioning of the end of the fiber is important. A light source 6 is provided underneath the target location, and is diffused by the substrate to provide sufficient contrast for the image to be analyzed to determine the position of the end of the fiber. In other embodiments such as where there is no intervening substrate, the desired diffusion could obviously be provided by other means. A camera 7 is located so as to view the target area and the end of the optical fiber from above.

Because an optical fiber is mostly translucent, an accurate image of the tip or the edges of the fiber is difficult to obtain. However, for automating the process, it is essential to be able to obtain clear positional information for the tip and edges of the fiber.

The diffused light source both provides the light for the camera and the illuminated backdrop against which the camera takes the image of the fiber. The tip and the edges of the fiber appear as shadows to the camera because the optical fiber acts as a lens and concentrates or diffuses the light passing through it toward the center of the fiber.

Here the importance of the diffuse light source becomes apparent, as otherwise the contrast would not be as pronounced. First, the diffused light source, acting as an illuminated backdrop, accentuates for the camera and the image processing unit the lines defining the fiber's shadow. Second, it is generally true that the an object's edge bends some of the light passing in its vicinity, resulting in a halo effect which is commonly seen when a picture of an object against a light source is taken. However, the more diffused a light source is, the less pronounce this effect. Therefore, by using a diffused light source, the contrast between the shadowed edges and the illuminated background becomes very pronounced. This strong contrast results in the ability to obtain a sharp line defining the optical fiber's edge or tip for use in the image processing unit, which tries to determine the position of lines in an image.

Because of high definition obtained as a result of the use of diffused light source, the position of the tip of the fiber may be determined with better than 1 micron accuracy.

As seen in FIG. 2, the gripper 1 is attached to the end of a robotic arm 8. The arm is capable of positioning the gripper and the fiber in a precise manner, such that in combination with the accuracy of the vision system, it is possible to ensure that the end of the optical fiber is positioned to within less than one micron of the location of the target.

FIG. 1 shows the camera schematically, but in FIG. 2 it can be seen that for space reasons it is preferable to orient the camera differently, and to use a mirror 9 to permit this.

Figure 3:
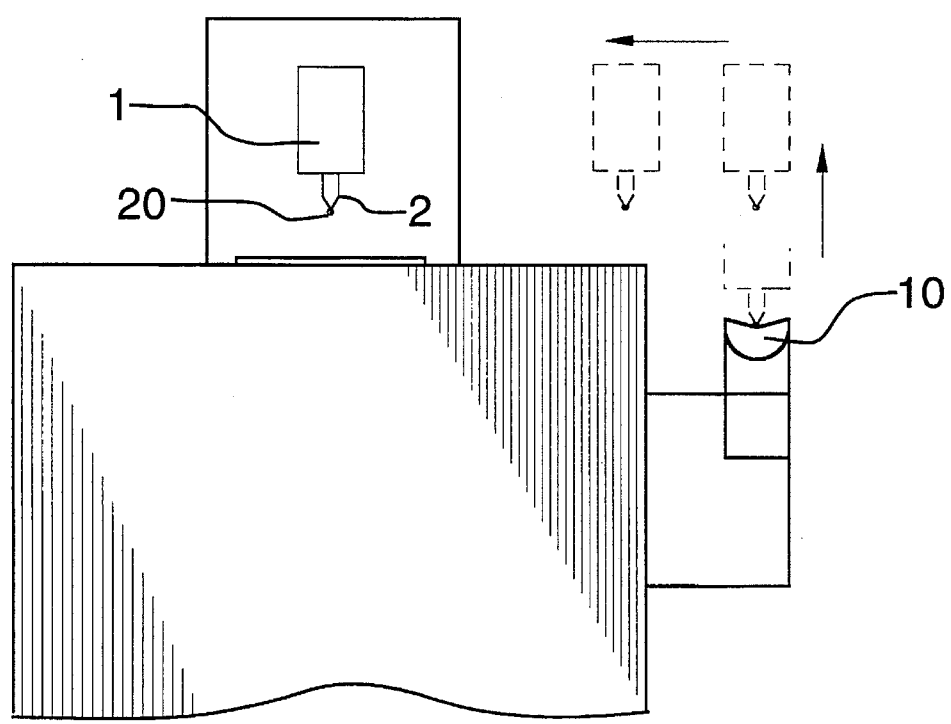
FIG. 3 is an end view of the system components.

FIG. 3 shows the operation of the system in an end view. The gripper is moved to a pickup tray 10, where it is brought into close alignment with an optical fiber near its end. The pickup tray has previously been loaded, manually or automatically, with an optical fiber. The configuration of the pickup tray is such that the fiber is automatically aligned properly for pickup, but the end 21 of the fiber does not need to be precisely positioned. Vacuum is then applied, to capture the optical fiber. It is then transported by the gripper to the area of the camera, so that its precise location in relation to the target may then be determined, prior to final positioning.

Conventional image analysis software determines the location of the end of the optical fiber in relation to the target, in the X-Y plane. Due to previous calibration of the height of the gripper tip in relation to the height of the substrate, the location of the target and of the optical fiber in the Z or height plane is already known, and does not need to be determined by the vision system. The camera preferably is generally perpendicular to the fiber and the diffused light source, so that parallax errors can be discounted, but the camera clearly could be positioned off the center line as long as appropriate error correction is implemented in the software.

Once the position of the end of the fiber in relation to the target has been determined, the arm 8 transports the optical fiber to the correct target position for the soldering, fusing, or other necessary operation to be carried out.

Figure 4:
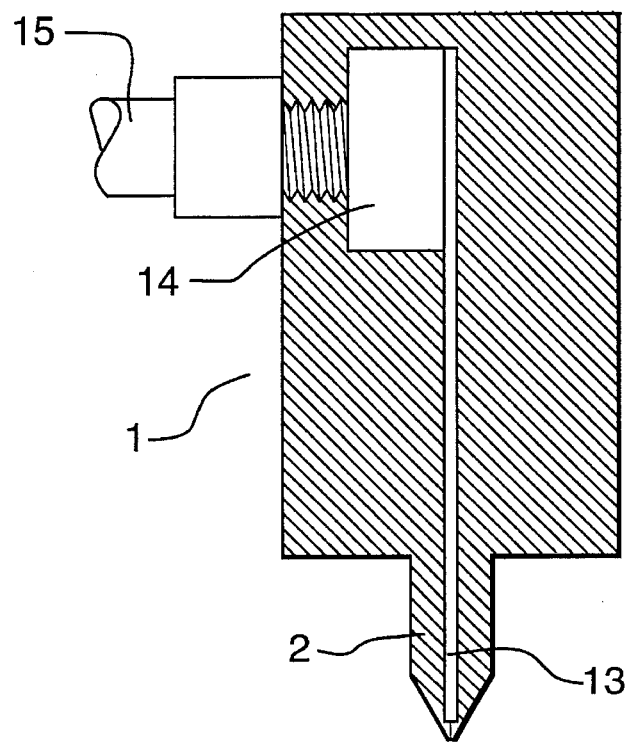
FIG. 4 is an end sectional view of the gripper.
Figure 5:
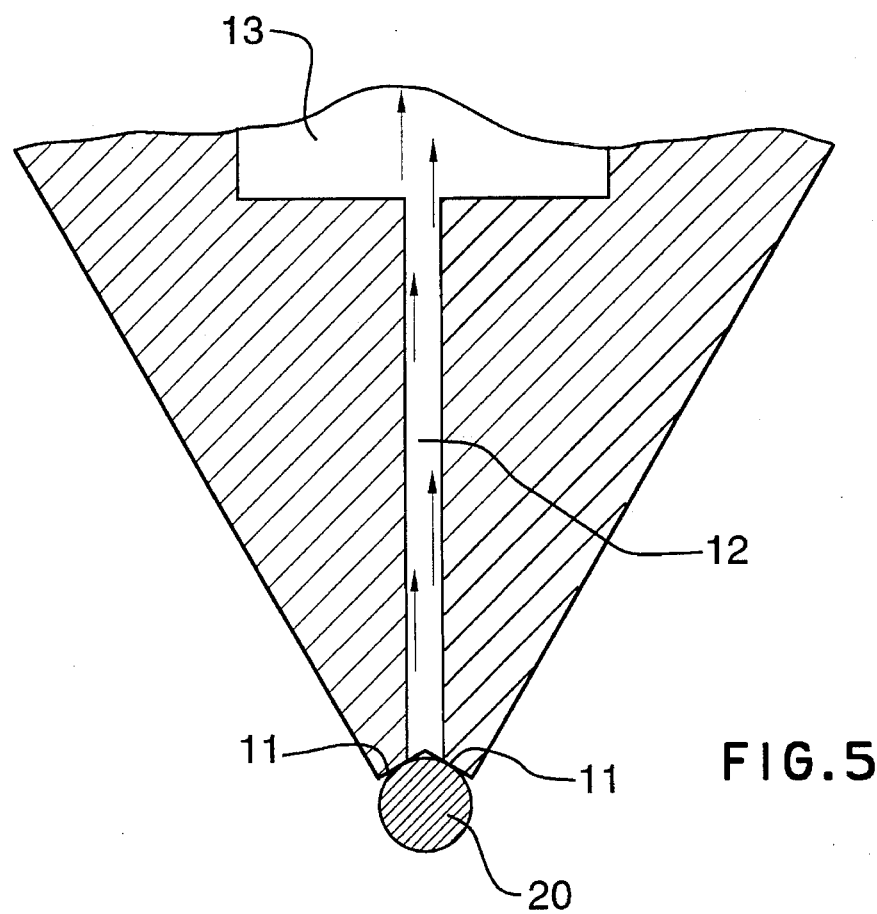
FIG. 5 is an end sectional view of the tip of the gripper.
Figure 6:
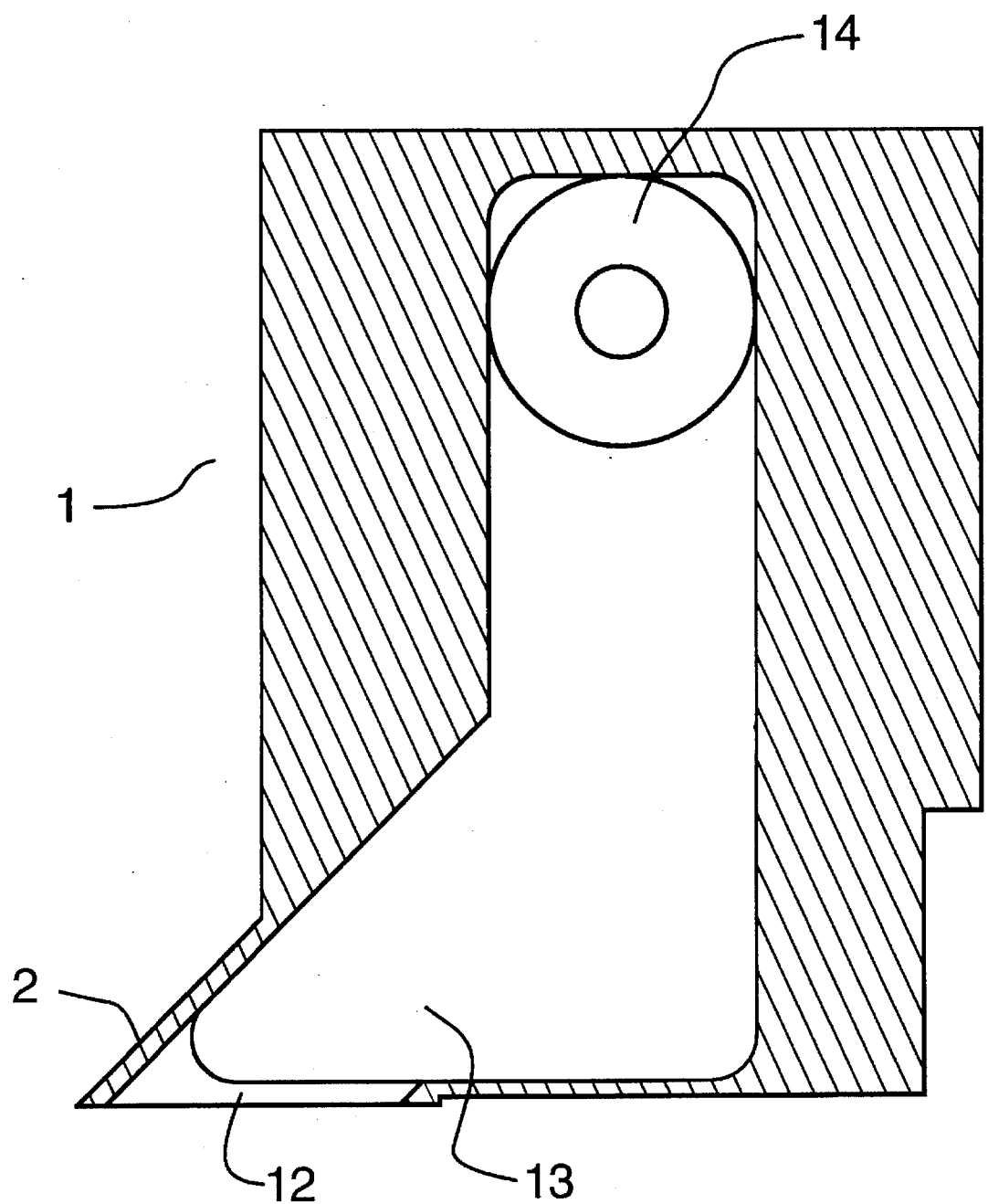
FIG. 6 is a side sectional view of the tip of the gripper.

Details of the gripper are shown in FIGS. 4–6. It should be appreciated that the dimensions of the gripper are quite small. The preferred embodiment of the gripper has approximate dimensions of 1"×1"×½", making the gripper an easy tool to control and therefore use in automation. Of course, the dimensions may be made smaller or larger, depending on the application. While the preferred embodiment is made of metal, it could instead be made of other material such as plastic or elastomers.

The bottom of the tip has two angled surfaces 11 which define a shallow V-shape, to accommodate the optical fiber. Preferably, as shown in FIG. 5, the overall width of the bottom of the tip is comparable to the diameter of the optical fiber. A small air channel 12 passes up the center of the tip, to a larger air channel 13, which eventually leads to a plenum 14 to which a vacuum hose 15 is connected. Since the size of the small air channel 12 is very small, it is desirable to open up to the slightly larger air channel 13 to minimize the pressure drop through the channels. In the preferred embodiment, the small air channel 12 is a slot which extends longitudinally along the front portion of the tip, and the larger air channel 13 is a corresponding slot. However, it should be clear that a number of vacuum holes could be used instead of such a continuous slot arrangement. All that is required is that sufficient vacuum be delivered to securely hold and transport the optical fiber.

It should be clearly recognized that the V-shape is not strictly essential, although it is essential that there be surfaces against which the fiber is positively located by the vacuum. A U-shape, or a trough shape, or other similar shape could also be used, or a radius matched to the radius of the optical fiber could be used.

The vacuum holds the fiber quite effectively, without applying mechanical force which might damage the fiber. The angled surfaces 11 help to orient the fiber, so that it is parallel to the tip. If desired, the gripper can be translated or rotated in any direction or about any axis, so that the fiber can be oriented in space in any desirable manner.

It will be appreciated that the above description related to the preferred embodiment by way of example only. Other variations of the invention will be obvious to those knowledgeable in the field. For example, the invention may be made from other material or manufactured used different methods. The gripper in the preferred embodiment is made of two halves; however, it is also possible to make the invention from one piece or from more than two pieces put together. The diffused light source may be created by directing a light to partially reflective backdrop. Many other variations on the invention will be obvious to those knowledgeable in the field, and such obvious variations are within the scope of the invention as described and claimed, whether or not expressly described.

What is claimed as the invention is:

1. Apparatus for gripping an optical fiber and positioning a free end of the optical fiber at a target location, comprising:

a pickup location, where an optical fiber is placed for pickup;

a camera directed to receive an image of the region of said target location;

a light source directed towards said camera, positioned such that said region of said target location is between said light source and said camera;

means for diffusing light from said light source;

a moveable arm, and gripping means on an end of said arm, for lifting said optical fiber from said pickup location with its free end extending slightly from said gripping means, for transporting said optical fiber to position said free end in the region of said target location for viewing by said camera, and for transporting said optical fiber to position said free end at said target location; and image processing software for analyzing an image from said camera to determine the position of said free end in relation to said target location when said free end is in the region of said target location; whereby said free end of said optical fiber may be positioned accurately at said target location by said moveable arm after determination of its position in relation to said target location.

2. Apparatus as recited in claim 1, where said gripper comprises a body having a downwardly-opening groove running longitudinally along a lower tip portion thereof, with an apex beneath which said optical fiber may be accommodated, said body having a vacuum source connected to a plenum therein and having at least one internal channel communicating between said plenum and the apex of said groove to supply vacuum to the latter.

3. Apparatus as recited in claim 2, where said at least one internal channel comprises a longitudinal slot running along at least a portion of said apex of said groove.

4. Apparatus as recited in claim 2, where said at least one internal channel comprises a plurality of holes.

5. Apparatus as recited in claim 2, where said groove has a width which is comparable to the diameter of the optical fiber.

6. Apparatus as recited in claim 5, where said at least one internal channel comprises a longitudinal slot running along at least a portion of said apex of said groove.

7. Apparatus as recited in claim 5, where said at least one internal channel comprises a plurality of holes.

8. Apparatus as recited in claim 1, where said target location is adjacent a component mounted on a translucent substrate, and where said means for diffusing light from said light source comprises said substrate.

9. A method for accurately positioning the free end of an optical fiber at a target location, comprising the steps of:

using a gripper mounted on a moveable arm to pick up an optical fiber at a pickup location, with the free end of the optical fiber extending from said gripper;

moving said arm to position said free end generally in the region of said target location, but slightly displaced therefrom;

obtaining an image of said region of said target location from a camera directed to receive said image, where said region is backlit by diffused light from a light source;

analyzing said image from said camera to determine the position of said free end in relation to said target location; and moving said arm to accurately position said free end at said target location based on said determination of relative positions.

* * * * *